United States Patent
Winkler et al.

(10) Patent No.: US 11,374,266 B2
(45) Date of Patent: Jun. 28, 2022

(54) SYSTEM FOR PERMANENTLY MARKING AT LEAST ONE BATTERY COMPONENT

(71) Applicant: Intilion GmbH, Zwickau (DE)

(72) Inventors: Norman Winkler, Zwickau (DE); Thomas Nawrath, Zwickau (DE)

(73) Assignee: Intilion GmbH, Zwickau (DE)

( * ) Notice: Subject to any disclaimer, the term of this patent is extended or adjusted under 35 U.S.C. 154(b) by 263 days.

(21) Appl. No.: 16/477,818

(22) PCT Filed: Dec. 19, 2017

(86) PCT No.: PCT/EP2017/083553
§ 371 (c)(1),
(2) Date: Oct. 16, 2019

(87) PCT Pub. No.: WO2018/134015
PCT Pub. Date: Jul. 26, 2018

(65) Prior Publication Data
US 2020/0044291 A1    Feb. 6, 2020

(30) Foreign Application Priority Data
Jan. 17, 2017 (DE) ................. 10 2017 100 772.5

(51) Int. Cl.
*H01M 10/44* (2006.01)
*H01M 10/42* (2006.01)
*H01M 10/48* (2006.01)

(52) U.S. Cl.
CPC ..... *H01M 10/425* (2013.01); *H01M 10/4221* (2013.01); *H01M 10/48* (2013.01); *H01M 2010/4271* (2013.01)

(58) Field of Classification Search
CPC .......... H01M 10/425; H01M 10/4257; H01M 10/4278; H01M 10/4221; H01M 10/48; H01M 10/482; H01M 2010/4271
See application file for complete search history.

(56) References Cited

U.S. PATENT DOCUMENTS 5,963,018 A    10/1999 Guthrie
6,577,105 B1    6/2003 Iwaizono
(Continued)

FOREIGN PATENT DOCUMENTS

CN        1304559 A    7/2001
CN      101916887 A    12/2010
(Continued)

OTHER PUBLICATIONS

European Patent Office, "Search Report", in application No. PCT/EP2017/083553, dated Mar. 28, 2008, 4 pages.
(Continued)

*Primary Examiner* — Raymond Alejandro
(74) *Attorney, Agent, or Firm* — Hickman Becker Bingham Ledesma LLP

(57) ABSTRACT

A system for permanently marking at least one battery component includes at least one marking element which is assigned to the battery component. The system includes a battery management system for operating the battery component in dependence on a state of the marking element. At least one marking device can be electrically connected to the marking element in such a way that a permanent change in the state of the marking element can be carried out by the marking device. The marking element is provided outside the battery management system such that operation of the battery component is permanently adaptable by the change of state.

15 Claims, 4 Drawing Sheets

(56) References Cited

U.S. PATENT DOCUMENTS

Figure 1:
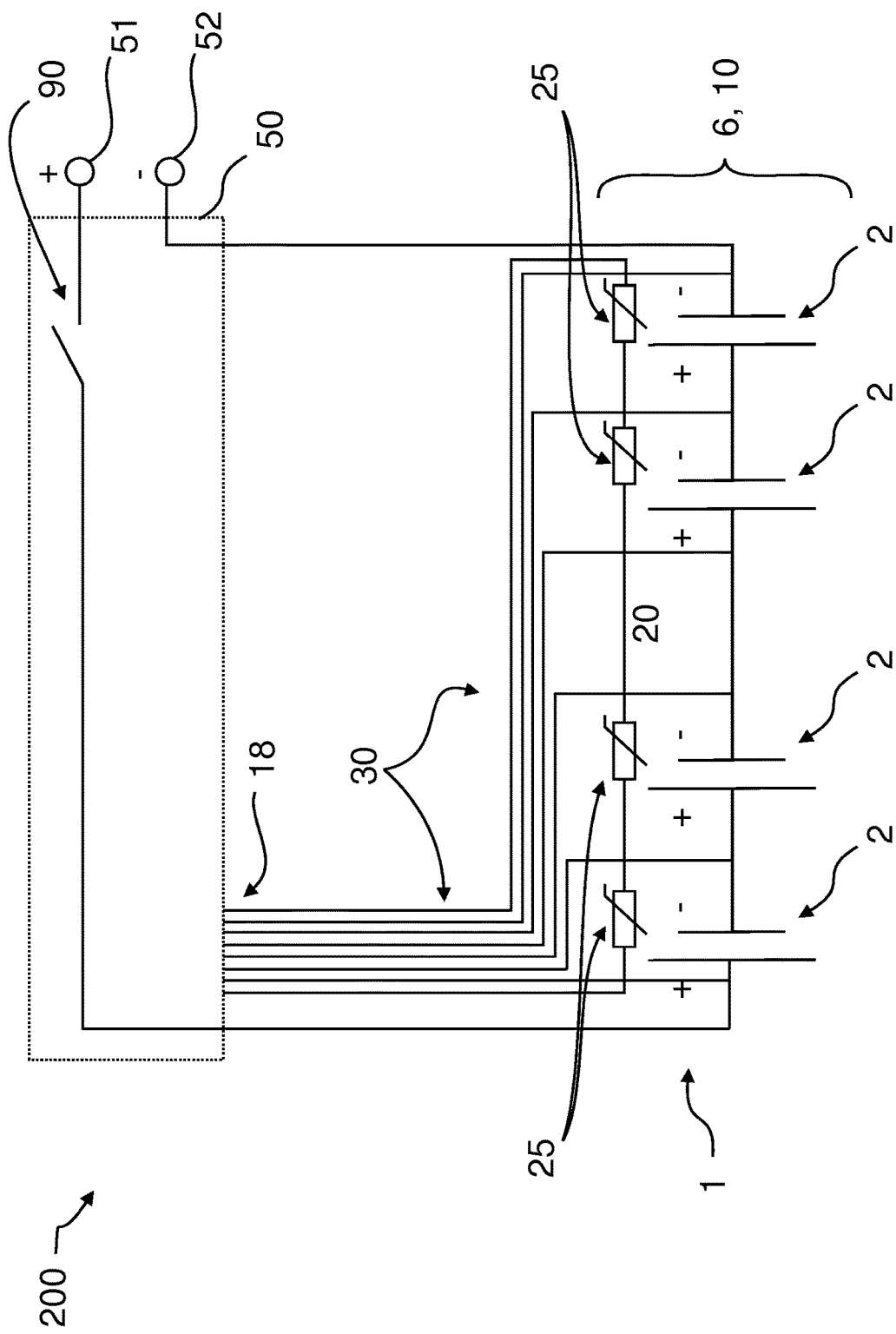

| | | |
|---|---|---|
| 7,508,171 B2 | 3/2009 | Carrier |
| 8,922,959 B2 | 12/2014 | Cho |
| 8,981,683 B2 | 3/2015 | Hambitzer |
| 9,755,443 B2 | 9/2017 | Fink |
| 9,761,911 B2 | 9/2017 | Lee |
| 9,954,215 B2 | 4/2018 | Pevear |
| 10,828,994 B2 | 11/2020 | Goetz |
| 2011/0318612 A1 | 12/2011 | Laible |
| 2015/0140379 A1* | 5/2015 | Yau ............... H01M 10/425 429/90 |
| 2016/0013827 A1 | 1/2016 | Hubinak et al. |

FOREIGN PATENT DOCUMENTS

| | | |
|---|---|---|
| CN | 102742066 A | 10/2012 |
| CN | 103026544 A | 4/2013 |
| CN | 202978302 U | 6/2013 |
| CN | 103493255 A | 1/2014 |
| CN | 104412444 A | 3/2015 |
| CN | 104795855 A | 7/2015 |
| CN | 106099898 A | 11/2016 |
| DE | 102008054543 A | 6/2010 |
| DE | 102013223320 A | 6/2015 |
| DE | 102014014739 A | 4/2016 |

OTHER PUBLICATIONS

German Patent Office, "Office Action" in Application No. 10 2017 100 772.5, dated Mar. 11, 2022, 12 pages.

Current Claims in Application No. 201780083689.0, dated Dec. 30, 2021, 4 pages.

China Patent Office, "Office Action", in Application No. 201780083689.0, dated Dec. 30, 2021, 9 pages.

\* cited by examiner

SYSTEM FOR PERMANENTLY MARKING AT LEAST ONE BATTERY COMPONENT

This invention relates to a system for permanent marking of at least one battery component. Furthermore, the invention relates to a battery component and a method for permanently marking at least one battery component.

It is known from the state of the art that critical states must be detected in rechargeable batteries and that suitable measures are taken to prevent risks and/or damage in response. Battery management systems (BMS) are often used for this purpose, in particular to monitor large batteries (i.e. also battery systems). The functions used for this purpose are usually to be classified as safety-critical. This is the case, for example, with the detection of the service life of the battery, in particular of a battery component. If an end of life of the (entire) battery or a component of the battery is detected, it must be ensured that the battery or battery component is taken out of service. For this reason, the BMS, for example, must reliably store the relevant information and make it usable during battery operation.

A disadvantage of the known solutions for performing such functions is that this information on decommissioning can often only be retained in a technically complex and extensive manner. For example, if the BMS is changed, a comprehensive and error-prone transfer procedure of the information to the new BMS must take place. This is often time-consuming, inflexible and/or costly.

It is therefore a task of the present invention to at least partially eliminate the disadvantages described above. In particular, it is an object of the present invention to propose an improved and/or simpler and/or more reliable way of determining and/or maintaining a mark on a battery component.

The preceding object is solved by a system with the features of claim 1, by a battery component with the features of claim 10 and by a procedure with the features of claim 11. Further features and details of the invention result from the respective dependent claims, the description and the drawings. Features and details which are described in connection with the system according to the invention also apply, of course, in connection with the battery component conforming to the invention as well as the method according to the invention, and vice versa in each case, so that with regard to the disclosure of the individual aspects of the invention, mutual reference is or can always be made.

The object is solved in particular by a system for permanent marking of at least one battery component:
- at least one marking element which is assigned to the battery component and which is integrated, in particular, in the battery component and/or is fixedly connected to the battery component,
- a battery management system for operating the battery component depending on a state of the marking element,
- at least one marking device (in particular of the battery management system) which can be electrically connected and/or connected to the marking element in such a way that a permanent (in particular permanent) change in the state of the marking element (in particular for marking) can be performed by the marking device (in particular as a function of monitoring of the battery component by the battery management system).

In particular, the marking element is provided outside the battery management system, so that the operation of the battery component (in particular by the or at least one further battery management system) can be permanently adapted by changing the state (of the marking element), in particular beyond a change and/or restart of the battery management system (BMS). This has the advantage that even if the BMS is changed, the marking, which can be determined from the requirement of the marking element, remains permanently intact. In particular, the requirement of the marking element, i.e. the marking, indicates information as to whether the battery component may be operated or not, in particular whether there is a defect in the battery component or not. Preferably, a costly transfer of this information from a BMS to be changed to a new BMS can be dispensed with, since the information is stored outside the BMS.

A "permanent" retention of the mark and/or a "permanent change of state" is preferably understood to mean that the state or the mark is retained even after a change of the BMS. In the narrower sense it is also understood that the requirement or marking is provided and/or determined in the battery component or is inherently provided in the battery component.

Preferably, the battery component is configured as at least one battery cell or cell stack of a rechargeable battery or as the entire rechargeable battery (i.e. in particular the battery system or battery module). In particular, the battery may have one or more battery components, or may form the battery component itself. For example, the battery may be configured as a rechargeable battery, especially a lithium-ion battery. Depending on the application, either the entire battery or only individual parts of the battery can be marked.

A marking is preferably carried out by changing the state of the marking element from a first state to a second state. For example, the first state is a normal state, in particular an intact state, and the second state is an error state, in particular a destroyed or defective state of the marking element. This change of requirement is preferably irreversible, i.e. cannot be reversed without repair or replacement of the marking element in particular. For example, the operation of the battery component is adapted, for example, by the battery component being operated normally when the first state is present and/or not being operated actively (deactivated) when the second state is present. Depending on the size of the battery component (e.g. only one battery cell or the entire battery), the battery or a part of it can be reliably deactivated permanently.

In particular, "operation of the battery component" is understood to mean that during normal active operation the power supply is normally provided by the battery component and/or other functions of the battery component, such as charging or discharging or even temporary deactivation, by the BMS. On the other hand, the battery component can be completely and/or permanently deactivated in an adapted operation, e.g. if a corresponding marking or a second state of the marking element is present. If the battery component comprises only one battery cell, further battery cells (in the absence of a corresponding mark or the second state for these battery cells), for example, can continue to operate normally.

Furthermore, it may be provided within the scope of the invention that the state of the marking element can be changed permanently and/or non-volatile and/or irreversibly by the marking device, so that safety-relevant information can preferably be stored permanently and/or non-volatile and/or irreversibly by the marking element and/or the operation of the battery component can be adapted. The safety-relevant information preferably includes the information whether the battery component may be operated or not, i.e. whether there is a defect or not. For example, when a defect is detected, the battery component can be marked by changing the state of the marking element. For example, a marking of further battery components, which are operated by the BMS, can also be carried out analogously. This has the advantage that in a simple and reliable way the battery component(s) can be permanently deactivated and/or the operation is (are) adaptable.

Furthermore, it is conceivable that the battery component is configured as and/or comprises at least one cell (battery cell) or at least one cell stack, and preferably comprises the marking element. Preferably, other battery components may also be provided, e.g. as (battery) cells of a rechargeable battery. For example, a marking element can be provided for each of the battery components. These marking elements may, for example, be electrically connectable and/or connected to one or more marking device(s) in order to change the state of the respective marking elements. This allows a comprehensive and reliable adaptation of the operation.

According to an advantageous further training of the invention, it may be provided that the marking element is integrated into an electrical circuit for operating and/or monitoring the battery component, so that a safety-relevant information can be permanently stored and assigned to the battery component preferably by changing the state. The electrical circuit serves, for example, to monitor an operation and/or a temperature and/or a voltage of the battery component (i.e. if necessary also several battery components), in particular to measure ordetect. This ensures reliable operation of the battery.

Preferably, a marking requirement, in particular an overtemperature and/or an overcharge and/or an overvoltage and/or a detectable battery parameter (such as a voltage or a current) outside a predetermined normal range and/or the like, can be detected on the battery component preferably by means of monitoring the battery component (i.e. possibly also further battery components). In particular, monitoring can detect irreparable damage to the battery component. For example, if such a detection is positive, the marking of the battery component can be performed (i.e. the change of state can be performed) to adapt further operation of the battery component, in particular to deactivate the battery component. This reliably prevents damage to the battery.

Furthermore, it is conceivable that the marking element is integrated into an electrical measuring path of the battery component, in particular the measuring path for monitoring the battery component being electrically connectable to the battery management system, preferably the marking device comprising an energy source, in particular a constant current source, which is configured to electrically influence, in particular destroy, the marking element for the change of state. In addition, a measuring device of the BMS can be provided, for example, to evaluate electrical signals of the measuring path for monitoring. The measuring path includes, for example, measuring elements such as sensor elements and/or temperature-dependent resistors, e.g. for temperature and/or voltage measurement. The marking device and/or the measuring device can, for example, be electrically connected to the measuring path via at least one electrical line, in particular a cable harness. For example, the measuring device includes the marking device or vice versa. The marking element is, for example, integrated serially to the measuring elements in the measuring path, so that preferably the same current (in particular also from the energy source) flows through both the measuring elements and the marking element. For example, the marking element can also be configured as a measuring element and thus also have a measuring function during normal operation. This enables a structurally simple and reliable marking.

Furthermore, it is conceivable that the marking element is configured as an electrical component, which is preferably configured exclusively for the permanent storage of safety-relevant information for the battery component. Thus, the marking element is especially (also functionally) configured separately from other components, such as measuring elements for monitoring, or a measuring function. In particular, this has the advantage that monitoring can continue even after marking.

Another advantage may be that the marking element is configured as a thermal fuse and/or fuse which can be electrically influenced by the marking device for the change of state in such a way that the marking element triggers irreversibly, in particular interrupting a circuit of the battery component. For this purpose, for example, an overcurrent is initiated by the marking device, for example by a measuring path with the marking element. Thus, marking can be performed in a simple and cost-effective way.

Furthermore, the invention may provide that the marking element can be irreversibly destroyed by the marking device in order to change the state, the marking element preferably being configured as a semiconductor component and/or as a diode, in particular a Z-diode. This ensures that the marking is permanent and can influence the operation of the battery component.

It is also conceivable that the marking element is configured as an electronic memory element so that safety-relevant information can preferably be stored digitally by the marking device in the marking element by changing the state. This enables a particularly flexible marking of the battery component, which can also be reversible, for example. Thus, for example, the marking can simply be reset after the defect of the battery component has been repaired. In addition, the memory element can also be used to store additional information simultaneously in or for the battery component. A circuit board is preferably provided for the battery component, in particular on the cell stack, the storage element being arranged on the circuit board. In particular, digital communication takes place with the memory element to perform the change of state.

Preferably, it may be possible that the marking element is a component (already present in the battery component or in the system for operating the battery component and/or electrical component) which, for example, (original and/or primary) already has a function which differs from the (secondary) function of the marking. For example, if a safety-critical requirement or the like occurs, this marking element can then be used, e.g. by destroying the marking element, for permanent marking and/or signaling of the safety-critical condition for the BMS. In other words, it may be possible that the original function of the marking element is permanently or irreversibly destroyed by the change of state. The original function can be, for example, a function for temperature detection and/or fuse protection (as with a thermal fuse) and/or measurement detection and/or voltage regulation or stabilization (as with a Z diode).

Another embodiment of the invention is a battery component with a marking element for permanently marking the battery component, in particular according to a system according to the invention. Here it is in particular provided that the battery component has at least one electrical connection for connection to a battery management system for operating and/or monitoring the battery component, wherein the marking of the battery component can be stored permanently and independently of the battery management system on the basis of a state of the marking element, in particular so that even after a restart or change of the battery management system the state and/or the marking can be stored and/or read out. The battery component according to the invention thus has the same advantages as those described in detail with reference to a system according to the invention.

Another embodiment of the invention is a method for permanently marking at least one battery component, preferably the battery component comprising at least one (in particular irreversible) marking element.

In particular, it is provided here that at least one of the following steps is performed, preferably the steps being able to be performed one after the other or in any order, preferably individual steps also being able to be performed repeatedly:

Monitoring the battery component (in particular by a battery management system) to determine at least one monitoring result, Detection of a marking requirement (e.g. a safety critical and/or reversible requirement) on the basis of the monitoring result, Initiating a permanent (in particular irreversible) change of a state of the marking element when the marking requirement (positive) is detected, so that preferably the marking element changes from a normal state to an error state, in particular so that even after a restart or change of the battery management system the state and/or the marking can be stored and/or read out, Operation of the battery component depending on the condition of the marking element, in particular through a battery management system.

Thus, the procedure according to the invention has the same advantages as described in detail with regard to a system according to the invention and a battery component according to the invention. In addition, the procedure may be suitable for operating a system and/or battery component according to the invention.

Furthermore, it may be provided within the scope of the invention that the monitoring and/or operation (of the battery component) is performed by a battery management system, wherein the state of the marking element is preferably read out (in time) before or during the operation by a marking device or monitoring device of the battery management system, in particular during a restart and/or a new initiation and/or a change of the battery management system. In particular, it can be ensured that the condition is evaluated before operation and that the operation can be adapted.

Optionally, it may be provided that the marking requirement comprises at least one safety-critical, in particular reversible, condition of the battery component, preferably a temporary overvoltage and/or temporary undervoltage and/or temporary overtemperature in the battery component, in particular in a cell stack. Especially in such reversible safety critical conditions, the problem is that after the temporary occurrence and presence of the marking requirement or safety critical condition and the return to normal condition of the battery component, the battery component reappears "normal". Accordingly, without marking the battery component, the BMS cannot detect that this safety-critical condition has already occurred. However, the battery component must not be reused in order to avoid damage, for example. This is ensured particularly reliably by the marking outside the BMS, in particular when the safety-critical condition is detected for the first time.

It may be provided that the marking requirement, in particular the safety-critical state and/or as a safety-critical function, comprises at least one of the following states and/or functions:

End of life of the battery component,

A voltage, in particular a cell voltage, in the battery component below and/or above a permissible voltage range (e.g. a predetermined normal range), A current, in particular a cell current, in the battery component below and/or above a permissible current range (e.g. a predetermined normal range).

Especially when the battery has reached the end of its service life, the battery should be taken out of service to avoid the risk of damage. The detection of cell voltages outside an approved range also has the advantage that self-discharges of the cells, discharges by the BMS itself or similar can be reliably detected. In particular, a deep discharge can thus be detected. For deep discharge protection, the battery or battery component in particular must then be switched off (by adjusting the operation) in order to prevent recharging. This is often necessary even if the cell voltages (e.g. through heating, hysteresis of tension, recovery of cell chemistry, etc.) find their way back to the normal range. In other words, this can be described as a reversible safety-critical state. Often the problem with conventional systems is that with a change of the BMS the information about the (at least first and/or unique) occurrence of the safety-critical condition is lost. This can be prevented by permanent marking (or changing the state). In particular, when operating the battery component, the battery or battery component may remain permanently and/or completely deactivated, depending on the condition of the marking element.

In particular, it may be provided that the initiation of a permanent change of the state of the marking element and/or the operation of the battery component depending on the state of the marking element and/or the operation after a change of the BMS (with maintenance of the changed state) according to predefined requirements, in particular the requirements and/or criteria of a functional safety, may be performed. In particular, monitoring measures are used to detect, for example, faults during operation of the battery component.

For example, it is possible that the marking element is configured as an electrical component which is implemented on the battery component, in particular (possibly) with a cell stack. In particular, the marking element has the property of changing state when initiated by the BMS, e.g. for a specific signal emitted by the BMS. This has the advantage that this new state can be read out by the same BMS (e.g. also after a restart of the BMS) or by another BMS (e.g. when changing the BMS) in order to determine safety-relevant information. This information can then be used, for example, to prevent further safety-critical use of the battery component. Preferably, the marking element, in particular as a (thermal) fuse, can be implemented in at least one electrical line, in particular a wiring harness. The marking element and/or such a thermal fuse can normally have the function of detecting and then triggering an overtemperature even if the BMS is deactivated. When the BMS is started, a past excess temperature can then be detected. In particular, such a marking element can be used for permanent marking to permanently mark the battery component, in particular a cell stack. It may be possible that a constant current source or similar is provided to initiate a change in the state of the marking element, which is integrated in a measuring path, for example. In particular, if a marking requirement (e.g. a critical state) is detected, this detection can be permanently stored by using the constant current source. For this purpose, the constant current source can, for example, allow a current to flow through the measuring path which is higher than the rated current of the marking element. In particular, the marking element can be triggered as a fuse, which can be clearly seen by the BMS, since the measuring voltage then strikes the upper or lower end of the measuring range depending on the circuit topology. After a change of the BMS, e.g. due to maintenance or repair, a new BMS can automatically detect the defect of the fuse or marking element and thus the marking and react to it, e.g. adapt the operation of the battery component. Alternatively or additionally, the marking element can also be configured as a fuse or Z-diode or as a memory module (memory element). In particular, if a Z diode is used, the change in state can be detected by the BMS by the Z diode indicating a changed conductance.

Furthermore, it is conceivable within the scope of the invention that after or during the detection of the marking required a permanent, in particular persistent and/or non-volatile, change of the state of the marking element takes place as a temporary marking requirement, wherein the state preferably remains changed even after a change of a battery management system. This can significantly increase safety when operating the battery component.

In accordance with an advantageous embodiment of the invention, it may be provided that the battery component is only actively operated if the marking element of the battery component has a normal state, wherein the error preferentially indicates a defect of the battery component, in particular a permanent and/or irreparable defect, and the battery component is preferably deactivated when the error is read out. In particular, deactivation takes place before the battery component is operated by the BMS. For this purpose, the BMS can have a corresponding configuration that indicates that a marker is to be evaluated.

Further advantages, features and details of the invention result from the following description, in which embodiments of the invention are described in detail with reference to the drawings.

Figure 3:
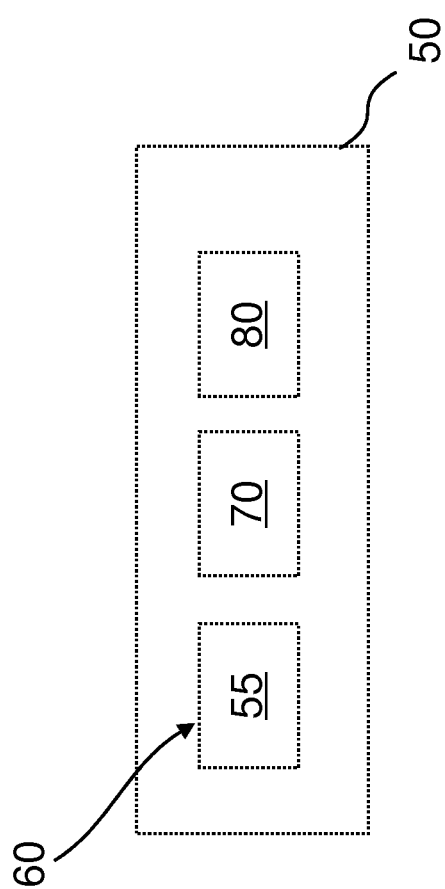
Figure 4:
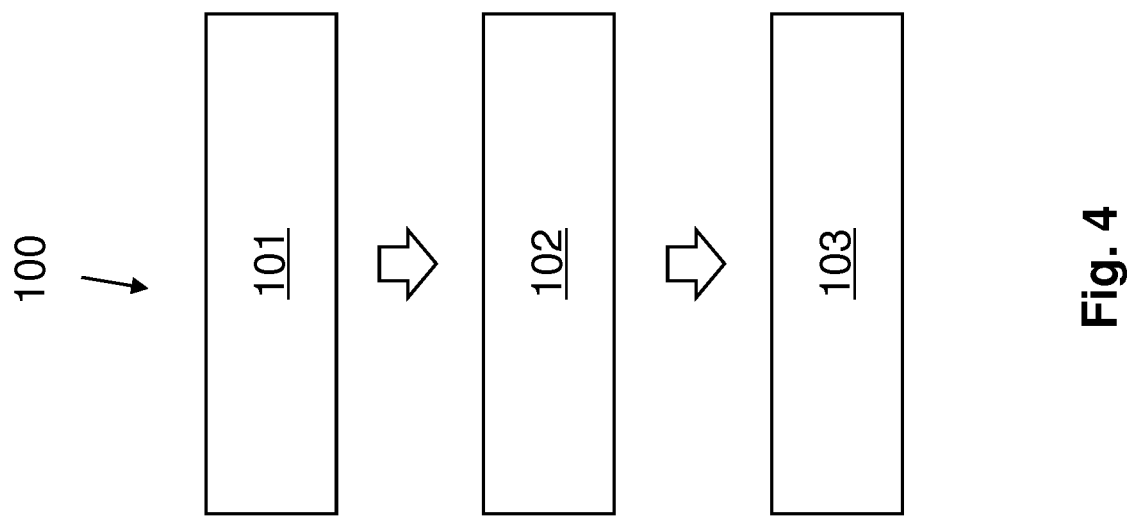

The features mentioned in the claims and in the description may be essential to the invention either individually or in any combination. They show schematically in each case:

FIG. 1, 2 A representation of a system according to the invention,

FIG. 3 A representation of a battery management system,

FIG. 4 An illustration for the visualization of a method according to the invention.

In the following figures, the identical reference signs are used for the same technical characteristics, even for different embodiments.

FIG. 1 schematically shows a system 200 according to the invention. The system 200 according to the invention comprises at least one battery management system 50 for operating at least one battery component 10. The battery component 10 can be configured as at least one cell stack 6 or as at least one cell 2 or also as an entire battery 1 and/or have these.

Figure 2:
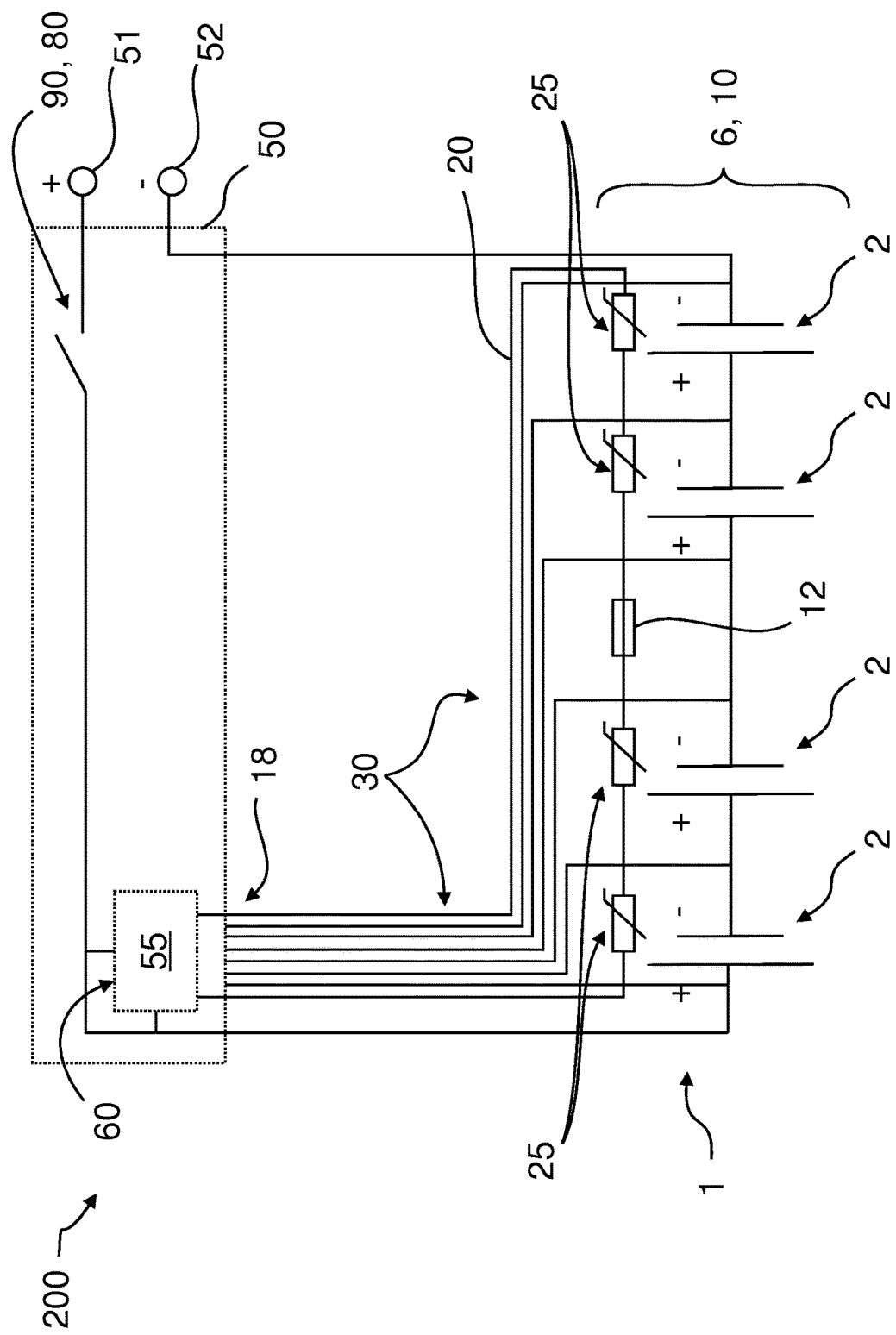

Furthermore, the inventive system 200 comprises at least one marking element 12, as shown in particular in FIG. 2. In particular, marking element 12 may include an existing and/or additional component of the inventive system 200, preferably the battery component 10. The marking element 12 is configured in such a way that it enables permanent marking of the battery component 10. The marking element 12 is therefore provided outside the battery management system 50, so that operation of the battery component 10 by the battery management system 50 can be permanently adapted by changing the state of the marking element 12.

For example, the marking element 12 can be integrated in a measuring path 20 for the battery component 10, for example as a thermal fuse or the like. The measuring path 20, for example, comprises several measuring elements 25, in particular temperature-dependent resistors or the like. The measuring elements 25 serve, for example, to monitor the voltage and/or temperature of the battery component 10. In particular, the measuring elements 25 serve to monitor at least one respective cell 2 of the battery component 10. In order to enable monitoring and/or evaluation of monitoring, in particular measurement, the battery management system 50 can be connected to the measuring path 20, for example via a cable harness 30 and/or via at least one electrical line. For this purpose, the battery management system 50 and/or the battery component 10 (each) may, for example, have at least one electrical terminal 18. Depending on the monitoring, a disconnecting device 90 can then be activated, for example, especially in the presence of a safety-critical state. The disconnecting device 90 enables, for example, the interruption of a circuit of the battery component 10.

As shown in FIGS. 1 and 2, the battery component 10 is operated, for example, via a first connection point 51 and via at least one second connection point 52, connected, for example, to a load and/or an on-board network of a vehicle and/or the like. The first and second connection points 51, 52 thus enable energy to be transferred from the battery component 10 to the load, for example. The 90 isolating device enables, for example, the prevention of this energy transfer in the event of a fault. Preferably, the separating device 90 can be controlled by a control device 80 to prevent energy transmission when a safety-critical state is detected and in particular also as a function of a state of the marking element 12. The control device 80, for example, is part of the battery management system 50.

FIG. 2 further shows that the battery management system 50 may include a marking device 60, in particular with an energy source of 55, if applicable. In particular, the marking device 60 is electrically connected to the marking element 12 in such a way that a permanent change of the state of the marking element 12 can be carried out by the marking device 60. This can be done, for example, by providing a current through the marking device 60, in particular through the energy source 55, in measurement path 20. In particular, this current is above a rated current of the marking element 12. This leads in particular to the destruction of the marking element 12, so that a permanent marking for initiating the safety-critical condition is possible.

FIG. 3 shows the battery management system 50 schematically with further details. It can be seen that the battery management system 50 has at least one marking device 60, optionally with at least one energy source 55. Furthermore, the battery management system 50 may include at least one monitoring device 70 and/or at least one control device 80.

FIG. 4 schematically visualizes a procedure 100 according to the invention. According to a first method step 101, a battery component 10 is monitored to determine at least one monitoring result. In a second step, step 102, a marking requirement is detected on the basis of the monitoring result. A third method step 103 initiates a permanent change of state of a marking element 12 when the marking requirement is detected, so that the marking element 12 changes from a normal state to an error.

The preceding explanation of the embodiments describes the present invention exclusively in the context of examples. Of course, individual features of the embodiments can be freely combined with each other, if technically reasonable, without leaving the scope of the present invention.

REFERENCE CHARACTER LIST

1 Battery
2 Cell

6 Cell stack
10 Battery component
12 Marking element
18 Electrical terminal
20 Measurement path
25 Measuring element
30 Cable harness
50 Battery management system
51 1$^{st}$ connection point
52 2nd connection point
55 Energy source
60 Marking device
70 Monitoring device
80 Drive device
90 Disconnecting device
100 Methods
200 System

The invention claimed is:

1. A system for permanently marking at least one battery component, comprising:
at least one marking element associated with the at least one battery component, the at least one marking element having a state associated therewith;
a battery management system for operating the at least one battery component based on the state of the at least one marking element;
at least one marking device which can be electrically connected to the at least one marking element and configured to selectively make a permanent change in the state of the at least one marking element;
wherein the at least one marking element is provided outside the battery management system such that operation of the at least one battery component is permanently adaptable by the change in the state;
wherein the at least one marking element is integrated into an electrical measuring path of the at least one battery component, the measuring path being electrically connectable to the battery management system for monitoring the at least one battery component, the at least one marking device comprising an energy source which is configured to electrically influence the at least one marking element for changing the state.

2. The system according to claim 1, wherein the state of the at least one marking element can at least be changed permanently or non-volatile or irreversibly by the at least one marking device, so that safety-relevant information can at least be stored permanently or non-volatile or irreversibly by at least the at least one marking element or the operation of the at least one battery component can be adapted.

3. The system according to claim 1, wherein the at least one battery component comprises at least one cell.

4. The system according to claim 3, wherein the at least one battery component comprises at least a cell stack.

5. The system according to claim 1, wherein the at least one marking element is integrated into at least an electrical circuit for operating or monitoring the at least one battery component, so that safety-relevant information can be permanently stored and associated with the at least one battery component by changing the state.

6. The system according to claim 1, wherein the at least one marking element is configured as an electrical component which, preferably after the change of state, is configured exclusively for permanent storage of safety-relevant information for the at least one battery component.

7. The system according to claim 1,
wherein
the at least one marking element is at least configured as a thermal fuse or fuse which can be electrically influenced by the at least one marking device for changing the state in such a way that the at least one marking element triggers irreversibly.

8. The system according to claim 7, wherein the at least one marking element interrupts an electric circuit of the at least one battery component.

9. The system according to claim 1,
wherein
the at least one marking element can be irreversibly destroyed by the at least one marking device in order to change the state, the at least one marking element preferably being configured as at least a semiconductor component or as a diode.

10. The system according to claim 1,
wherein
the at least one marking element is configured as an electronic memory element so that safety-relevant information can be stored digitally in the at least one marking element by the at least one marking device by changing the state.

11. The system according to claim 1, wherein the at least one marking device is configured to electrically destroy the at least one marking element.

12. The system according to claim 11, wherein the at least one marking device is a current source.

13. The system according to claim 11, wherein the at least one marking element is a Z diode.

14. The system according to claim 1, wherein the at least one marking device is configured to:
monitor the battery component to determine at least one monitoring result;
detect a marking requirement based on the monitoring result;
in response to detecting the marking requirement, initiate the permanent change in the state of the at least one marking element such that the at least one marking element changes from a normal state to an error state; and
wherein the battery management system is configured to not operate the battery component when the at least one marking element is in the error state.

15. The system according to claim 14, wherein:
the at least one battery component has at least one electrical terminal for connection to the battery management system for at least one of operating or monitoring the at least one battery component; and
the permanent change in the state of the at least one marking element is storable permanently and independently of the battery management system.

* * * * *